J. D. Dale.
Balance Scales.
N°899.
Patented Aug. 30, 1838.
Sheet 1-2 Sheets.
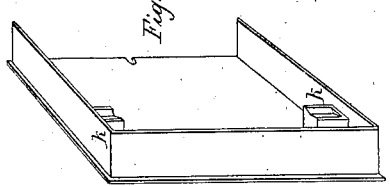
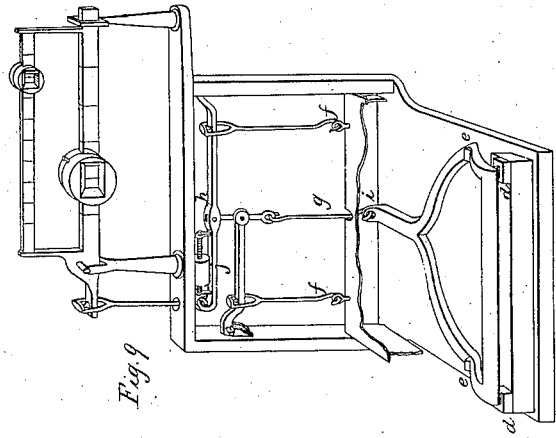
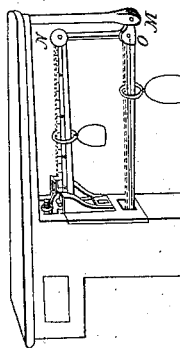
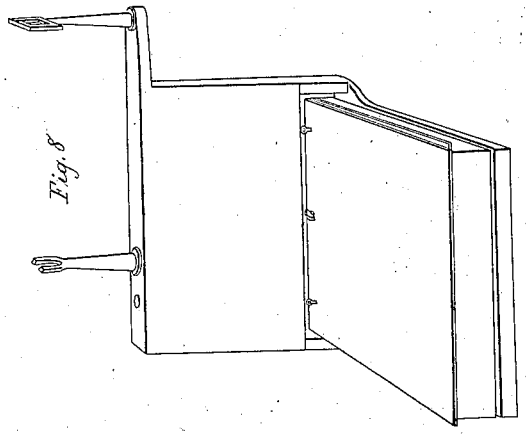
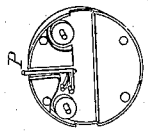

J. D. DALE.
Balance Scales.
No. 899.
2 Sheets—Sheet 2.
Patented Aug. 30, 1838.
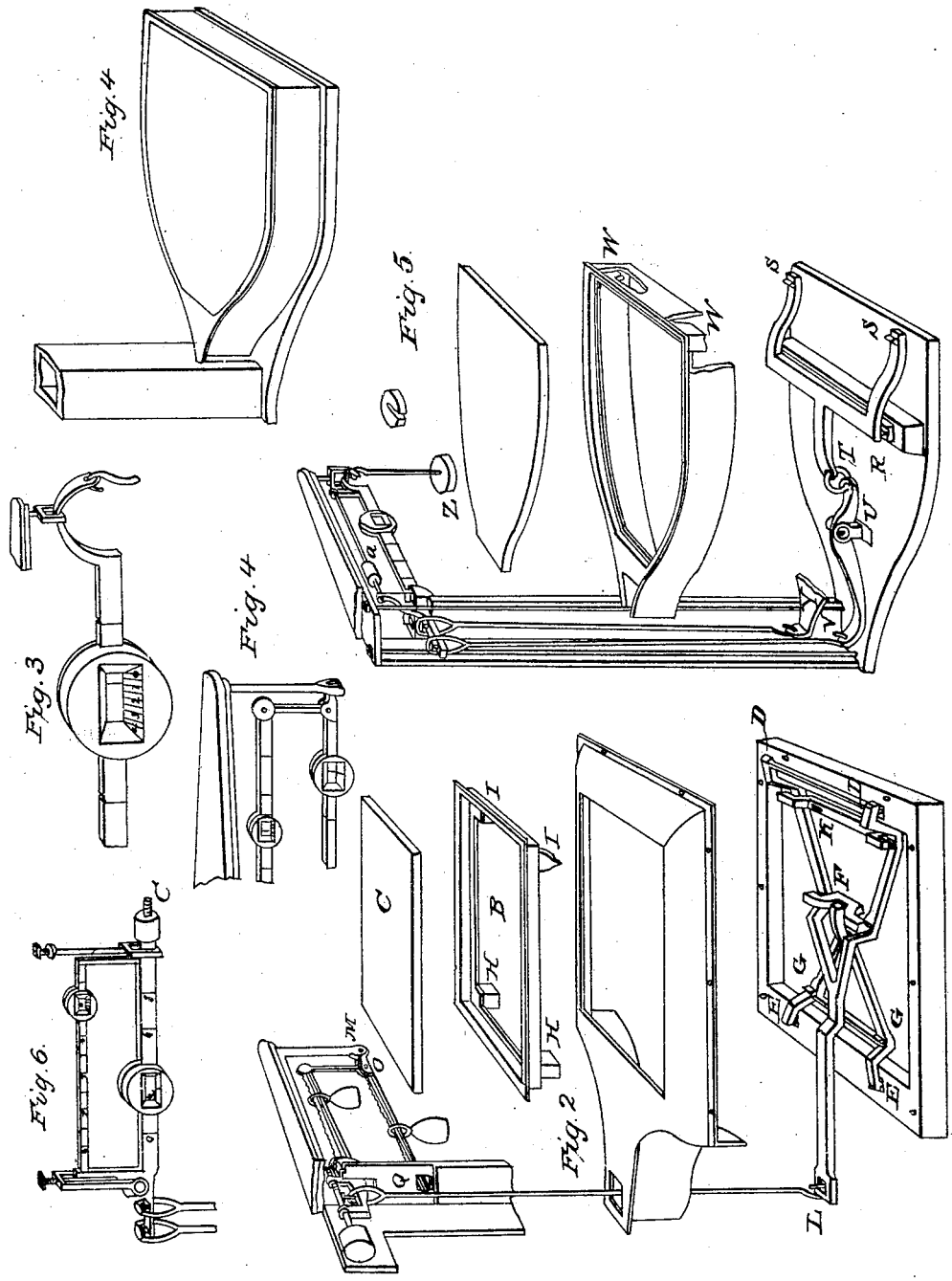

UNITED STATES PATENT OFFICE.

JOHN D. DALE, OF LANSINGBURG, NEW YORK.

PLATFORM-BALANCE AND SCALE-BEAM FOR WEIGHING.

Specification of Letters Patent No. 899, dated August 30, 1838.

*To all whom it may concern:*

Be it known that I, JOHN D. DALE, of the village of Lansingburg, in the county of Rensselaer and State of New York, have invented new and useful Improvements in Scales for Weighing; and I do hereby declare that the following is a full and exact description.

I make my scales of three classes distinguished under the denominations of portable platform scales, dormant scales, and scales for counters and domestic use. To these my improvements are variously applied according as the scales are intended for heavy or light weighing.

The nature of my principal improvements in relation thereto consists in having two beams to one scale—differently graduated—as one to a division by tens, fifties, hundreds or the like—and the other to one of units or the fractional parts of a unit—with a sliding weight or common poise to each; and either connecting the beams with each other upon the principles of a double lever or as a beam having one fulcrum with two bars for its longest arm—running parallel to each other and permanently united by a cross bar at each end—or in having a single bar with one scale of graduation and a sliding weight—with provision at the end of the beam for adding when occasion requires another weight of specific power or a succession of them as equipoise to articles too heavy to be weighed by the slide upon the beam alone; and in providing also throughout for such ease and accuracy of movement and for such advantages in lever power as with beams and weights of moderate and convenient dimensions to constitute a weighing apparatus sufficient for all ordinary purposes.

The principles of other minor provisions and improvements will be explained as they occur in description.

No. I. One modification of a portable platform scale here to be described is represented in Figure I of the annexed drawings. Fig. II, represents the same scale with some of its parts separated from the others in order to show their form and connection.

The platform A, on which articles are placed for being weighed, I either make entirely of cast iron or other material or to consist of a rim or frame of iron as a bed piece as at B, to support a plank top fitted thereto as a flooring as at C. This platform is placed upon two levers so connected as in effect and in relation to the scale beam to operate as one, the principal lever consisting of a single bar at the back end is divided about the middle into two branches. These are extended forward in a diverging direction so as to terminate at the front of the scale—one near each corner as at D, D, where they rest upon a projection from the under side of each which constitute the fulcrum of the lever. These projections I make of a wedge like form terminating at an angle of forty five degrees more or less with the edge down, and place each in a socket provided for it in a steel plate which I fasten to the frame of the scale, the socket being also of an angular form but more obtuse in order that when placed therein with its edge upon the line formed by the meeting of the two sides of the socket both being in a crosswise direction to the scale the sides of the projection shall not come in contact with either. The fulcrum of the back lever is formed in the same manner at the end of two branches into which it is also divided as shown at E, E. These are extended forward and united in one a little back of the middle of the frame as shown in the drawing, from which the lever is continued in a single bar to a point at or near the center where a bar is placed across upon the arms of the other lever for the support of the forward end of this as at F. This bearing is upon a single steel point as a projection or fixture from the under side of the end of the lever resting in a socket upon the upper surface of the cross bar corresponding in form but with sides more diverging from its central point. The ends of the cross bar rest upon projections of a wedge form and in sockets upon the arms of the principal lever constructed upon like principles with those above described. It is here, by means of these several bearings that the two levers are in effect united in one—the fulcrum of each being exactly equidistant from them—and the platform also being made to rest upon the respective levers at points which in like manner are equidistant from the fulcrum of each end from this same line of bearing—thus equalizing and concentrating all the gravitating force of articles upon the platform which for the purposes of weighing is transmitted to the scale beams. The rests for the platform upon the back lever are by projections from its arms as at G, G, and sockets in the bottom of two studs as appendages of the platform as seen at H, H. In the forward end the projections are from the studs of like description as I, I, and their sockets upon a crank cross bar placed upon the arms of the principal lever one of which sockets is seen at K. This bar like that at the center rests upon projections placed in sockets (one at each end) of like description. The vertical crank like inflections of these cross bars as represented in the drawing, in connection with the projections and sockets above described are for the purpose of keeping each point in the same local position appointed for it and providing for an easy conformity to every movement of the levers in the process of weighing without affecting the perpendicular tending of their respective bearings.

To save repetition in description I will here remark that all bearings between different movable parts of this scale and of others yet to be described unless otherwise pointed out are provided for by means of projections from one of the proximate surfaces either of a point or wedge like form and a corresponding socket in the other and that both surfaces where they come in contact are made of steel and in form constructed upon principles like those above described.

The principal lever of the scale now under description, from the union of its branches is extended back in a single bar to a discretionary distance and at its termination connected by means of a hook and eye to a rod from the scale beam as seen at L, which brings upon it the entire weight of this end of the lever with the platform and whatever is placed upon it. The rod is suspended upon a point projecting up from the top of the beam at or near the end of its shortest arm—and the beam supported upon fixtures of the upright part of the frame in a manner similar to provisions of like character in scales in common use.

In providing for the application of double lever beams I bring down a fixture—a rod of sufficient size for my purpose—vertically from the extended top of the frame a little beyond the termination of this beam and extend the same far enough below its level to answer as to altitude for the support and fulcrum of my second beam. In the lower end of this fixture a slot is provided into which the end of the beam is fitted and fixed by means of a pin passing horizontally and transversely through them both—the beam being extended in the same lengthwise direction as the one above it, as seen at M. This allows the other end of the beam to move up and down as upon a flexible joint and constitutes its fulcrum. By a pin joint of similar construction a flat rod is attached to the end of the upper beam as at N, and its lower end in like manner in a slot provided for it in the lower beam at a point directly under it so as to extend the rod vertically between them as at O. The distance of this last point from the fulcrum determines the lever purchase it has upon the upper beam and is therefore the result of calculation in the arrangement and dimensions of the several members in connection; so also is the distance between the two beams in reference to the poise or sliding weight and its practical adjustment upon each.

I graduate the upper beam to the scale of smaller divisions prescribed and the lower beams to the larger—adapting the notations thereof to the kind of weight applied—as in notches on the back in the usual manner for the common poise with corresponding marks and figures on the side—or on the latter only for the slide—an opening being provided in the front side of the weight of discretionary form and size through which a section of the side surface of the beam is seen and by means of which and a central mark upon the margin of the opening they are readily adjusted to each other at any point of equipoise upon the beam. On the margin to this opening upon the slide of the upper beam I mark a short scale of still smaller divisions, if deemed necessary in its intended use, than is provided for in the scale of divisions upon the beams itself. This is shown in an enlarged view of a weight of this description in Fig. III. The application of weights of this kind requires that each beam as far as the weight is to slide upon it be of uniform width and thickness as shown together with the weights, in the sectional Fig. IV, and others in which weights of the same description are represented. In order to adapt weights of this kind still further to the purposes of heavy weighing, I make them so as to roll upon the beam by placing two small trundles within the weight (for the purpose of being easily placed upon the beam and taken off, I divide the weight platform into two parts) and inserting the ends of the axle upon which each trundle is fixed into apertures provided for them in the sides of the weight—as seen in Fig. VII. I also provide a spring within the weight as shown in the same figure, with a small projection from its under side so as to bear lightly upon the top of the beam and catch in the notches formed for the purpose and in correspondence with the marks and figures upon its side in order to hold the weight at the point to which it is adjusted until again required to be moved. It is then raised from the beam by means of a thumb piece connected with the spring and extended to the other surface of the weight as at P. The two parts of the weight are put together by screws.

Another kind of double beam consisting of two parallel bars fixed to each other by cross bars one at each end of its longest arm is represented in connection with a scale of different construction in Fig. VI, with this difference in my application of it to scales of the above description—that the fixture provided for the support of the outer end of the beam and as a gage to its up and down movement is here made an appendage of the extended top of the frame above the beam like that which supports the single beam in Fig. XI at o. I make the same distinction in graduating the two bars of this beam—the upper to the smaller and the lower to the larger scale of divisions as is observed in respect to the double lever beams above described—and in like manner apply to them the sliding weight or common poise at my option. In either case I provide a balance of the beams themselves by means of a rod with a ball attached passing horizontally through two short stud posts as projections from the top of the beam near its fulcrum as shown at $P^2$, Fig. II. A screw thread is cut in the rod and in the posts by which the balance is moved one way or the other as required for adjustment.

I omitted to state in its place and therefore supply it here, that the inner end of this lower lever beam is extended so as to enter into an opening provided for the purpose in the upright part of the frame as at Q, which serves for its support and as a gage to its up and down movement.

In order to a clearer understanding of my claims to improvements which will have been specified herein by referring to the particular description of each scale, should it become necessary, I here distinguish them by number in the same numerical order in which they are described—calling the above as No. I.

No. II. Number II is also a portable platform scale of a different description as represented in Figs. IV and V. In this are employed, to regulate and convey the heavier of the weighed articles to the scale beams, what may be called two levers—one above the other. The lower lever has its fulcrum and rests at a distance from its forward termination equal to about one fourth of its length upon a fixture of the bottom of the scale—the projections for which are from a bar constituting a part of the lever extended across from one rest to the other as at R R. From each end of this bar an arm is extended out to near the end of the scale and there forms the outward termination of the lever as at S, S. From the center of the same cross bar on the other side the lever is extended back in a single bar to a distance exactly equal to the length of the arms as thus described and is there connected by means of a ring to the end of another lever as seen at T, just half of the same distance short of its fulcrum. This fulcrum consists of a pin like that which is usually provided for the fulcrum of scale beams except that here its bearing edge is upward—the pin passing horizontally and transversely through the lever center on each side into a circular hoop or rim provided for it at the top of a short stud post made fast to the bottom of the scale as at U. The opposite arm of the lever is from this extended just twice the length of the shorter arm thus described where it is connected with a rod from the scale beam as at V. All this from the singleness of its bearing upon the scale beam and of the support which it gives to the platform is to be understood in the sense of this description as constituting one of the levers mentioned. The platform itself, in respect to its own bearings, forms the other—having its fulcrum at one end where the studs W, W, rest upon the projections S, S, at the extremity of the lower lever, and the other end, which terminates nearly at a point as shown in the drawing, connected, like the lever below with a rod from the scale beam, on which it has its entire bearing, as represented by the section of its back end upon the rod at Y. From this and the position of the points upon which the rods are suspended upon the scale beam it is obvious that the difference in their relative distance from its fulcrum would, if not counterbalanced, produce a corresponding difference in lever forces upon the bearing point of one over the other. To obviate this, the same difference of lever advantage in sustaining the articles to be weighed, with a reversed application of it, is provided for between the levers as above described, by which the loss or gain in one is reciprocally balanced in the other—so also the difference in extent of the up and down movement of the rods by the turning of the beams as produced by their unequal distances from its fulcrum coincides with that which obtains as the result of the same provisions in the ends of the levers with which they are respectively connected below. The effect of all which is that whether the gravitating influence of the weight upon the scale is communicated from the immediate bearing of this connected end of the platform or through the medium of the lower lever in any less or greater proportions the aggregate bearing upon the beam in respect to the balance weight upon its opposite arms is the same.

With scales of this description I use a single beam graduated to such divisions as are preferred, with a sliding weight like those above described—with the further provision by means of a rod from the end of the beam with a small platform attached as shown at Z or otherwise for applying an additional weight of given measure or any succession of them as occasional increase of head upon the scale over and above the balancing power of the slide upon the beam may require. These added weights are adjusted to such single or numerical divisions in units, tens, hundreds or the like as the intended use of the scale or other considerations render desirable. The scale beam itself with its appendages is balanced by a sliding ball or weight upon a rod attached to fixtures elevated from each end of the beam and running parallel to it as shown at e. Or instead of a beam of this description I use at my option a beam constructed upon the principles of the one above described with two parallel bars severally graduated and with a sliding weight to each as represented in Fig. VI. This beam as shown in the figure is balanced by a ball upon the end of the lower bar which for the purpose is terminated as a screw as at C.

No. III. Number III is a scale of still different construction belonging to the same class and is represented in Figs. VIII and IX. In this the platform is quadrangular and like the last constitutes one of two levers for sustaining the articles upon the scale. Here the lower lever has its fulcrum at the end of two arms which form its outward termination—resting upon fixtures of the bottom of the scale as at d d. The fulcrum of the platform which is its point of bearing upon the lower lever as at e e, I fix at such distance from the fulcrum of the lower lever as to obtain a purchase in that lever coincident with others yet to be described in connection by which the gravitating influence of articles upon the scales passing through this medium is received and transmitted to the scale beam. The back end of the platform is supported by two rods as seen at f f which are suspended from different levers of the same power both of which together with the rod which sustains the back end of the lower lever as at g are united in one at a central point of the upper of the two levers last mentioned as upon a pin point h. The end of the arm of this lever opposite its fulcrum is connected with a rod from the scale beam as at i. Here also as in the scale last described the effect as to weighing is the same whether more or less of the gravitation upon the platform passes by one or the other of these connected means of communication. With this scale I use a beam of two parallel bars constructed and graduated and with a sliding weight to each as above described and as represented in the figure. The beam is balanced by a sliding weight provided and fixed immediately above the upper lever near the end connected with the rod from the beam as shown at j. Fig. X is the platform on one side to show the studs k k by which it rests upon the projections from the arms of the lower lever as before described.

My dormant scales consist of scales constructed upon the same principles as either of the three denominations above described with this difference that instead of being attached to movable frames they are separately let into the floor of the apartment in which they are used so as to bring the platform nearly to the same level or only so far above it as to provide for the up and down movement necessary for the weighing process. In this case the levers and other appendages below the platform which in the portable scale are connected with the frame are here connected with fixtures of the floor or building in such manner as judgment and circumstances suggest. The elevated parts are the same as in the portable scale. The platform itself when desirable is made plainer and more in conformity with the floor with which it is connected or so at discretion as best to answer the purposes intended. It is also when desirable detached from any superstructure except for its own accommodation.

My scales for counters and domestic use embraced in the third class as above divided for description consist of those above described as Number II, reduced in size and graduated so as to adapt them to the use and purposes for which they are designed.

What I claim as my own invention of the improvements thus above specified and described and desire to secure by Letters Patent are the following:

1. Of those embraced in the description of the scale which I have distinguished as No. I, I claim the combination of the two steelyards as above described, whether they be adapted to hanging or sliding weights.

2. Of No. II, I claim the manner of constructing the lower levers—of sustaining the platform and connecting them severally with the scale beam as above described, and the arrangement of the point and lever, and friction rollers and of the sliding weights in manner and for the purposes hereinbefore specified and described. I also claim the making the sliding weight with a nonius or dividing it into fractional parts thereby obtaining greater accuracy in manner as above described.

3. Of No. III I claim the arrangement of the levers by which the platform is connected with the scale beam by means of the rods f f and g, in manner substantially as above described and this I claim as a modification of No. II.

JOHN D. DALE.

Witnesses:
Daniel Whiting,
Theodore A. Hale.